(12) United States Patent
Sankrithi

(10) Patent No.: US 11,312,496 B2
(45) Date of Patent: Apr. 26, 2022

(54) VEHICLE SEAT ASSEMBLIES

(71) Applicant: THE BOEING COMPANY, Chicago, IL (US)

(72) Inventor: Mithra Sankrithi, Edmonds, WA (US)

(73) Assignee: THE BOEING COMPANY, Chicago, IL (US)

(*) Notice: Subject to any disclaimer, the term of this patent is extended or adjusted under 35 U.S.C. 154(b) by 87 days.

(21) Appl. No.: 17/022,404

(22) Filed: Sep. 16, 2020

(65) Prior Publication Data

US 2020/0407065 A1    Dec. 31, 2020

Related U.S. Application Data

(62) Division of application No. 15/958,081, filed on Apr. 20, 2018, now Pat. No. 10,807,718.

(51) Int. Cl.
*B64D 11/06*    (2006.01)

(52) U.S. Cl.
CPC ........ *B64D 11/064* (2014.12); *B64D 11/0644* (2014.12); *B64D 11/0648* (2014.12)

(58) Field of Classification Search
CPC .............. B64D 11/064; B64D 11/0644; B64D 11/0647; B64D 11/0648
See application file for complete search history.

(56) References Cited

U.S. PATENT DOCUMENTS

| 6,152,401 | A | * | 11/2000 | Green | B60N 2/24 |
| | | | | | 244/118.6 |
| 2013/0328364 | A1 | * | 12/2013 | Cecinas | B60N 2/42709 |
| | | | | | 297/354.1 |
| 2017/0267143 | A1 | * | 9/2017 | Bowker | B60N 2/643 |

* cited by examiner

*Primary Examiner* — Richard G Davis
(74) *Attorney, Agent, or Firm* — The Small Patent Law Group LLC; Joseph M. Butscher

(57) ABSTRACT

A seat assembly is configured to be positioned within an interior cabin of a vehicle. The seat assembly includes a seat support structure that is configured to connect to a floor structure within the interior cabin of the vehicle. The seat support structure includes a seat base and a front end opposite from a rear end. Arm rests are pivotally coupled to the seat support structure. A seat back is pivotally coupled to the seat support structure proximate to pivotal coupling of the arm rests to the seat support structure. In at least one other embodiment, a seat back coupling upwardly and rearwardly extends from a middle portion of the rear cross beam. A seat back includes a narrowed mounting portion that pivotally couples to the seat back coupling without interfering with knee space formed in a back side of the seat back.

20 Claims, 11 Drawing Sheets

VEHICLE SEAT ASSEMBLIES

RELATED APPLICATIONS

This application is a division of U.S. patent application Ser. No. 15/958,081, entitled "Vehicle Seat Assemblies," filed Apr. 20, 2018, which is hereby incorporated by reference in its entirety.

FIELD OF EMBODIMENTS OF THE DISCLOSURE

Embodiments of the present disclosure generally relate to seat assemblies within interior cabins of vehicles, such as commercial aircraft, and, more particularly, to seat assemblies that provide an increased amount of knee space to passengers.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths and/or one or more doors of the aircraft. Passenger seats are positioned within the interior cabin.

Space within an interior cabin of a commercial aircraft is extremely valuable. In particular, an airline operator may increase revenues by providing additional seats within the interior cabin. Additional seats within the interior cabin also improve various airplane metrics, such as fuel burn per seat-mile, cash airplane related operating costs (CAROC) per seat-mile, airplane related operating costs (AROC) per seat-mile, and carbon dioxide emissions per seat-mile.

In order to increase a number of seats within economy class in particular, some providers have reduced seat pitch, which is a longitudinal distance or spacing between longitudinally adjacent seats. However, by reducing seat pitch, leg space is also reduced. A reduced seat pitch typically leads to reduced knee room for passengers. In particular, knees of taller or larger passengers may abut against or impinge a back (and/or an associated component, such as a seat pocket or tray) of an immediately forward seat.

A known slimline seat attempts to mitigate cramped knee space by having a thinner seatback structure and cushion. However, a taller or larger passenger may still have insufficient leg room, especially if the seat pitch is 29 inches or less.

SUMMARY OF THE DISCLOSURE

A need exists for a seat assembly within an interior cabin of a vehicle that is configured to provide increased knee space for passengers. Further, a need exists for a vehicle (such as an aircraft) having an interior cabin that includes a relatively short seat pitch between rows of seats (such as a 29 inch seat pitch or less) and seat assemblies that are able to comfortably accommodate taller and larger passengers so that the seated passengers are not susceptible to contacting an immediately forward seat with their knees.

With those needs in mind, certain embodiments of the present disclosure provide a seat assembly that configured to be positioned within an interior cabin of a vehicle. The seat assembly includes a seat support structure that is configured to connect to a floor structure within the interior cabin of the vehicle. The seat support structure includes a seat base and a front end opposite from a rear end. Arm rests are pivotally coupled to the seat support structure. A seat back is pivotally coupled to the seat support structure proximate to the pivotal coupling of the arm rests to the seat support structure.

The seat support structure may include front legs at the front end and rear legs at the rear end. The seat base may be supported by the front legs and the rear legs. In at least one embodiment, a distance between the front legs and the rear legs is less than that of a standard seat support structure.

In at least one embodiment, the seat support structure includes laterally spaced-apart extension beams that upwardly extend above the seat base. The arm rests are pivotally coupled to upper ends of the extension beams. The seat back may be pivotally coupled to the extension beams proximate to the pivotal coupling of the arm rests. In at least one embodiment, the seat back and the arm rests are coaxially coupled to the seat support structure.

The seat back includes a lower portion and an upper portion. A thickness of the seat back decreases from the upper portion towards the lower portion.

In at least one embodiment, the seat back includes a back side having a middle section that extends from a position proximate to the upper portion towards the lower portion. Lower side portions are inwardly recessed towards a front side of the seat back. The lower side portions are on opposite sides of a central rib. The lower side portions include inwardly curved surfaces that are shaped and contoured to provide increased knee room on opposite sides of the central rib. In at least one embodiment, the lower side portions of the seat back on opposite sides of a middle section of the seat back are inwardly recessed towards a front side of the seat back, such that the seat back thickness is reduced at the lower side portions to provide increased knee room on opposite sides of the middle section of the seat back.

The seat assembly may include a pocket secured to the central rib. The pocket may be above the lower side portions and does not extend into the lower side portions. Optionally, the pocket may be between the lower side portions and does not extend into the lower side portions.

In at least one embodiment, the front end is configured to be separated from another rear end of an immediately forward seat assembly by a pitch of 30 inches or less.

Certain embodiments of the present disclosure provide a method of providing a seat assembly that is configured to be positioned within an interior cabin of a vehicle. The method includes providing a seat support structure that is configured to connect to a floor structure within the interior cabin of the vehicle. The seat support structure includes a seat base and a front end opposite from a rear end. The method also includes pivotally coupling arm rests to the seat support structure, and pivotally coupling a seat back to the seat support structure proximate to the arm rests.

The method may include moving rear legs closer to front legs of a seat support structure such that a distance between the front legs and the rear legs is less than that of a standard seat support structure.

In at least one embodiment, the method includes coaxially coupling the seat back and the arm rests to the seat support structure.

In at least one embodiment, the method includes decreasing a thickness of the seat back from an upper portion towards a lower portion, and/or inwardly recessing lower side portions of a back side of the seat back towards a front side of the seat back.

The pivotally coupling the seat back operation may include pivotally coupling the seat back to the seat support structure away from the lower side portions.

The method may include securing a pocket to a central rib between the lower side portions.

Certain embodiments of the present disclosure provide a seat assembly configured to be positioned within an interior cabin of a vehicle. The seat assembly includes a seat support structure that is configured to connect to a floor structure within the interior cabin of the vehicle. The seat support structure includes a seat base, a front end opposite from a rear end, and a rear cross beam. A seat back coupling upwardly and rearwardly extends from a middle portion of the rear cross beam, such that the seat back coupling is not disposed in locations laterally spaced from the middle portion. A seat back includes a narrowed mounting portion that pivotally couples to the seat back coupling without interfering with knee space formed in a back side of the seat back.

The seat support structure may include front legs at the front end and rear legs at the rear end. The seat base may be supported by the front legs and the rear legs. A distance between the front legs and the rear legs is less than that of a standard seat support structure.

In at least one embodiment, the narrowed mounting portion of the seat back that pivotally couples to the seat back coupling is disposed in a middle section of the seat back and not in lower side portions of the seat back that are laterally spaced from the middle section. The lower side portions of the seat back on opposite sides of the middle section are inwardly recessed towards a front side of the seat back such that the seat back thickness is reduced at the lower side portions that are inwardly recessed to provide increased knee room on opposite sides of the middle section of the seat back.

The seat back includes a lower portion and an upper portion. A thickness of the seat back may decrease from the upper portion towards the lower portion.

The back side of the seat back may include a middle section that extends from a position proximate to the upper portion towards the lower portion. Lower side portions are inwardly recessed towards a front side of the seat back. The lower side portions are on opposite sides of a central rib. The lower side portions include inwardly curved surfaces that are shaped and contoured to provide increased knee room on opposite sides of the central rib. The seat back pivotally couples to the seat support structure away from the lower side portions.

A pocket may be secured to the central rib. The pocket may be above the lower side portions and does not extend into the lower side portions. The pocket may be between the lower side portions and does not extend into the lower side portions.

In at least one embodiment, the front end is configured to be separated from another rear end of an immediately forward seat assembly by a pitch of 30 inches or less.

Certain embodiments of the present disclosure provide a method of providing a seat assembly that is configured to be positioned within an interior cabin of a vehicle. The method includes providing a seat support structure that is configured to connect to a floor structure within the interior cabin of the vehicle. The seat support structure includes a seat base, a front end opposite from a rear end, and a rear cross beam. The method also includes providing a seat back coupling that upwardly and rearwardly extends from a middle portion of the rear cross beam, and pivotally coupling a narrowed mounting portion of a seat back to the seat back coupling without interfering with knee space formed in a back side of the seat back.

The method may also include moving rear legs closer to front legs of a seat support structure such that a distance between the front legs and the rear legs is less than that of a standard seat support structure.

In at least one embodiment, the method includes decreasing a thickness of the seat back from an upper portion towards a lower portion, and/or inwardly recessing lower side portions of a back side of the seat back towards a front side of the seat back.

The pivotally coupling operation may include pivotally coupling the narrowed mounting portion to the seat back coupling away from the lower side portions.

The method may include securing a pocket to a central rib between the lower side portions.

With respect to any of the embodiments of the present disclosure, the thickness of the seat back in non-central sections of the lower portion may be reduced compared to the thickness in the central section. The thickness of the seat back in non-central sections of the lower portion may be reduced to less than one inch.

With respect to any of the embodiments of the present disclosure, the thickness of the seat back in non-central sections of the lower portion may be reduced compared to the thickness in the central section. The thickness of the seat back in non-central sections of the lower portion may be reduced to less than one-half inch.

With respect to any of the embodiments of the present disclosure, the thickness of the seat back in non-central sections of the lower portion may be reduced compared to the thickness in non-central sections of the upper portion. The thickness of the seat back in a central section of the lower portion may be increased compared to the thickness in a central section of the upper portion. The increased thickness in the central section of the lower portion is associated with at least one of an increased cushion thickness for passenger lower back support, an increased cushion thickness for passenger lumbar support, and a thickness associated with a seat back pocket installation behind the central section of the lower portion.

Certain embodiments of the present disclosure provide an aircraft including seat assemblies, as described herein. Each seat assembly on the aircraft is positioned at a pitch spacing of approximately 29 inches relative to an immediately forward seat assembly. The thickness of the seat back in non-central parts of a lower portion is reduced in non-central sections of the lower portion of the seat back to provide sufficient accommodation for persons in the 99.5 percentile thigh length or persons having a thigh length up to 28.2 inches, without knee impingement into the seat back of an immediately forward seat assembly in the non-central sections of the lower portion of the seat back.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a seat assembly for an interior cabin of aircraft. The seat assembly is configured such that when multiple seat assemblies are positioned within the interior cabin with a short seat pitch (for example, 29 inches or less) between adjacent rows, even passengers that are at the 99th percentile of human height are able to comfortably sit therein without their knees abutting into an immediately-forward seat. As such, the seat assembly increases passenger comfort, and increases seat count within an interior cabin, which thereby increases revenue and profits for airline operators.

Certain embodiments of the present disclosure provide seat assembly for a vehicle that includes a seat support structure that is configured to connect to a floor structure in an interior cabin of the vehicle. The seat assembly may also include a seat back with a back side having a middle section with a narrowed mounting portion. First and second side portions of the back side of the seat back have a reduced thickness at locations laterally spaced from the middle section of the seat back. A seat back coupling may be connected to the narrowed mounting portion of the seat back, and to a middle section of the seat support structure such that the seat back coupling is not positioned in locations laterally spaced from the middle section. The narrowed mounting portion in the middle section and the reduced thickness of the side portions of the seat back at locations laterally spaced from the middle section of the seat back provide greater space to accommodate the knees of a passenger seated behind the seat back. In at least one embodiment, the seat back coupling pivotally connects the narrowed mounting portion of the seat back to a middle section of the seat support structure, such that the seat back is configured to pivotally recline without impinging on locations laterally spaced from the central section of the seat back.

Figure 1:
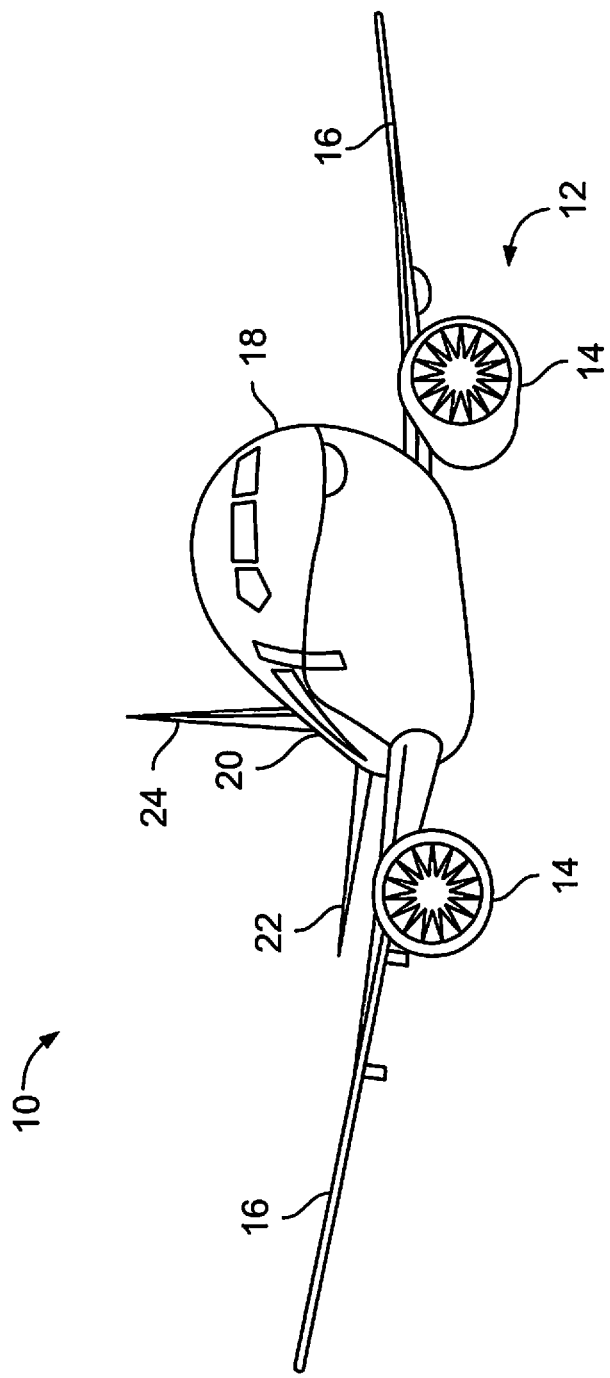
FIG. 1 illustrates a front perspective view of a vehicle, according to an embodiment of the present disclosure.

FIG. 1 illustrates a front perspective view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an interior cabin, which may include a cockpit, one or more work sections (for example, galleys, personnel carry-on baggage areas, and the like), one or more passenger sections (for example, first class, business class, and coach sections), and an aft section.

Alternatively, instead of an aircraft, embodiments of the present disclosure may be used with various other vehicles, such as automobiles, buses, locomotives and train cars, watercraft, spacecraft, and the like.

Figure 2A:
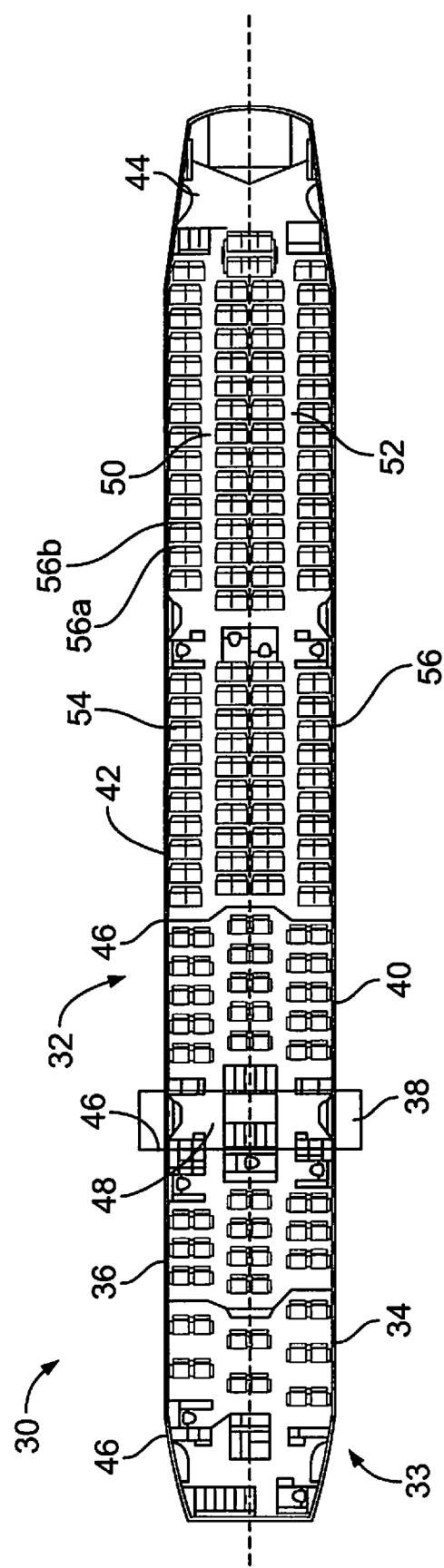
FIG. 2A illustrates a top plan view of an interior cabin of an aircraft, according to an embodiment of the present disclosure.

FIG. 2A illustrates a top plan view of an interior cabin 30 of an aircraft, according to an embodiment of the present disclosure. The interior cabin 30 may be within a fuselage 32 of the aircraft. For example, one or more fuselage wall members may define the interior cabin 30. The interior cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the interior cabin 30 may include more or less sections than shown. For example, the interior cabin 30 may not include a first class section, and may include more or less galley stations than shown. Each of the sections may be separated by a cabin transition area 46, which may include class divider assemblies between aisles 48.

As shown in FIG. 2A, the interior cabin 30 includes two aisles 50 and 52 that lead to the aft section 44. Optionally, the interior cabin 30 may have less or more aisles than shown. For example, the interior cabin 30 may include a single aisle that extends through the center of the interior cabin 30 that leads to the aft section 44.

Passenger seat assemblies 54 are secured within the interior cabin 30. The seat assemblies 54 are arranged in rows 56. For example, a row 56 of seat assemblies 54 may include a first set of two seat assemblies 54 separated from a middle set of four seat assemblies 54 by the aisle 50, and a second set of two seat assemblies 54 separated from the middle set of four seat assemblies 54 by the aisle 52. Each row 56 may include more or less seat assemblies 54 than shown. For example, a row 56 may include a first set of two seat assemblies 54 separated from a second set of two seat assemblies 54 by an aisle.

Adjacent rows 56 of seat assemblies 54 are separated from one another by a pitch (for example, a longitudinal spacing therebetween). As an example, the row 56*a* is separated from the row 56*b* by a pitch, which may be measured between a rear end of seat support structures of the seat assemblies 54 within the row 56*a* and corresponding rear end of seat support structures of the seat assemblies 54 within the row 56*b*. The pitch between the rows 56*a* and 56*b* may be 30 inches or less. In at least one embodiment, the pitch between the rows 56*a* and 56*b* is 29 inches. In at least one other embodiment, the pitch between the rows 56*a* and 56*b* is 28 inches. Optionally, the pitch between the rows 56*a* and 56*b* may exceed 30 inches. As described herein, the seat assemblies 54 are configured to provide ample knee room for taller passengers (such as passengers having thigh length of 28.2 inches or greater, which is in the 99.5 percentile of human thigh length) seated within the seat assemblies 54 separated from immediately forward seat assemblies 54 at a reduced pitch, such as 29 inches.

Figure 2B:
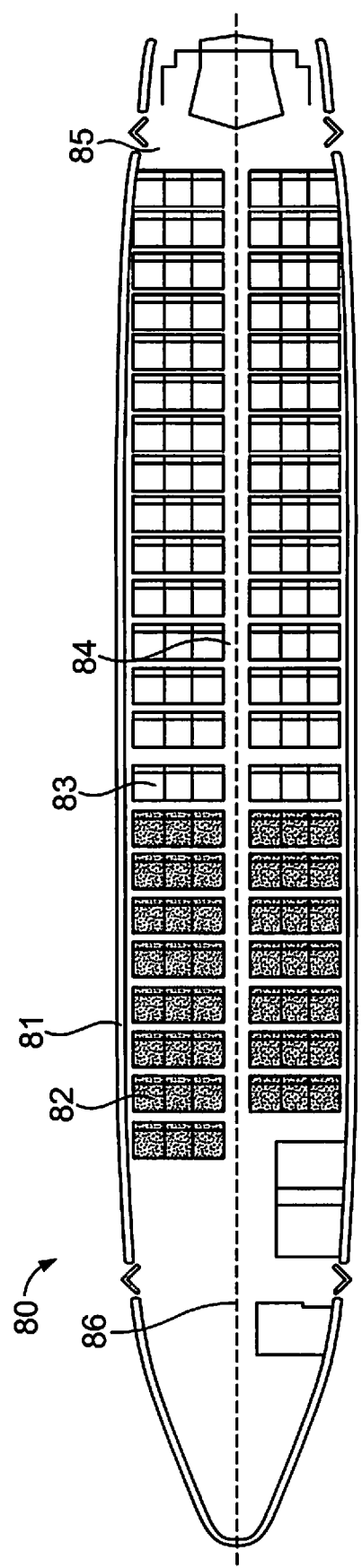
FIG. 2B illustrates a top plan view of an interior cabin of an aircraft, according to an embodiment of the present disclosure.

FIG. 2B illustrates a top plan view of an interior cabin 80 of an aircraft, according to an embodiment of the present disclosure. The interior cabin 80 may be within a fuselage 81 of the aircraft. For example, one or more fuselage wall members may define the interior cabin 80. The interior cabin 80 includes multiple sections, including a main cabin 82 having seat assemblies 83, and an aft section 85 behind the main cabin 82. It is to be understood that the interior cabin 80 may include more or less sections than shown.

The interior cabin 80 may include a single aisle 84 that leads to the aft section 85. The single aisle 84 may extend through the center of the interior cabin 80 that leads to the aft section 85. For example, the single aisle 84 may be coaxially aligned with a central longitudinal plane 86 of the interior cabin 80.

Figure 3:
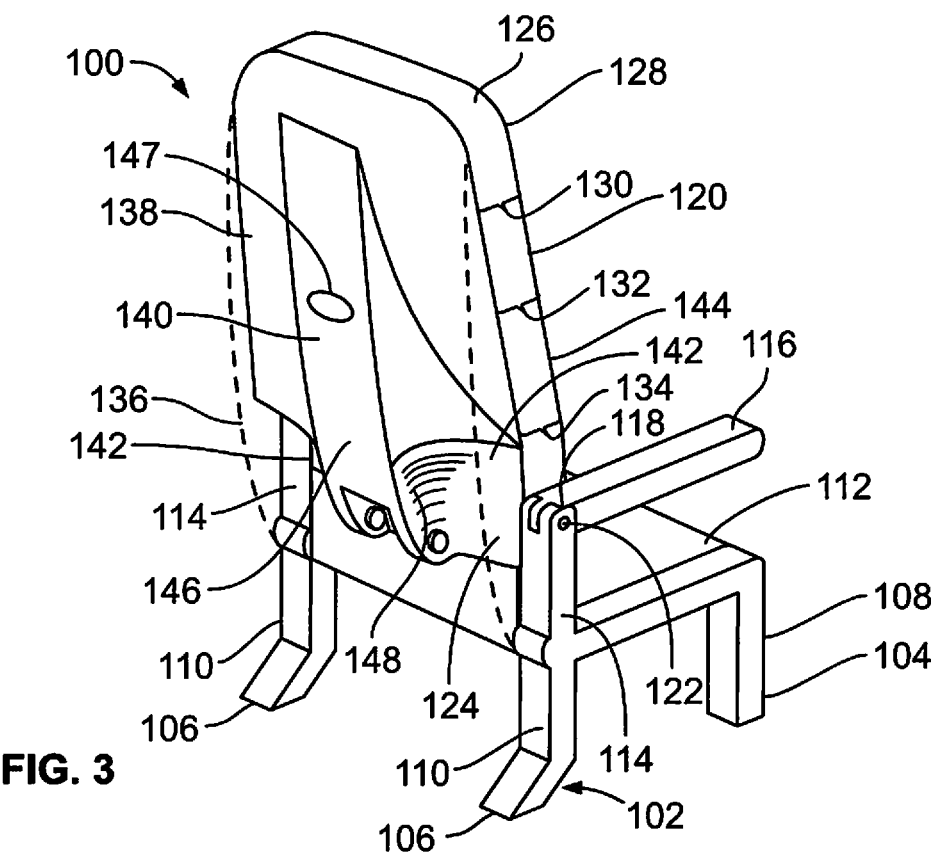
FIG. 3 illustrates a perspective rear view of a seat assembly, according to an embodiment of the present disclosure.

FIG. 3 illustrates a perspective rear view of a seat assembly 100, according to an embodiment of the present disclosure. The seat assembly 100 is an example of a seat assembly 54 shown in FIG. 2A or a seat assembly 83 shown in FIG. 2B.

The seat assembly 100 includes a seat support structure 102 that is configured to connect to a floor structure within an interior cabin, such as the interior cabin 30 shown in FIG. 2A or the interior cabin 80 shown in FIG. 2B. The seat support structure 102 includes a front end 104 opposite from a rear end 106. The front end 104 may be separated from a rear end 106 of an immediately forward seat assembly 100 by a pitch, as described above.

The seat support structure 102 may provide a base that includes front legs 108 at the front end 104 and rear legs 110 at the rear end 106. The legs 108 and 110 may be secured to tracks within an interior cabin of a vehicle. The legs 108 and 110 may include fittings, fasteners, or the like that are configured to securely connect the legs 108 and 110 to the tracks. The seat support structure 102 also includes a seat base 112 (such as a pan, cushion, and/or the like) supported by the front legs 108 and the rear legs 110.

The seat support structure 102 also includes laterally spaced-apart extension beams 114 that upwardly extend above the seat base 112. Arm rests 116 are pivotally coupled to upper ends 118 of the extension beams 114. The arm rests 116 are configured to pivot between vertical and horizontal positions about the pivot couplings with the extension beams 114.

A seat back or back rest 120 is pivotally coupled to the seat support structure 102. In at least one embodiment, the seat back 120 is pivotally coupled to the extension beams 114 proximate to for example, pivotally coupled to the same structure, at the same location, within 1-2 inches from one another, and/or the like) the arm rests 116. For example, the seat back 120 and the arm rests 116 may be coaxially coupled to the extension beams 114 (and/or another portion of the seat support structure 102). As shown, the pivot axis 122 for the arm rests 116 in relation to the extension beams 114 may be coaxial with that of the seat back 120 in relation to the extension beams 114. As shown, a lower portion 124 of the seat back 120 is pivotally coupled to the seat support structure 102 between opposed extension beams 114.

The seat back 120 also includes an upper portion 126 distally located from the lower portion 124. A back cushion 128 may forwardly extend from the seat back 120 between the upper portion 126 and the lower portion 124.

The upper portion 126 includes a thickness 130. The thickness of the seat back 120 tapers down between the upper portion 126 and the lower portion 124. For example, a mid-portion thickness 132 between the upper portion 126 and the lower portion 124 is less than the thickness 130 of the upper portion 126. A lower portion thickness 134 of the seat back 120 proximate to the arm rests 116 is less than the mid-portion thickness 132. As such, the thickness of the seat back 120 decreases from the upper portion 126 towards the lower portion 124. As shown, the seat back 120 has an overall reduced thickness as compared to a standard seat back 136, which is shown in dashed lines.

A back side 138 of the seat back 120 includes a middle section 140 that extends from a position proximate to the upper portion 126 towards the lower portion 124. Lower side portions 142 are inwardly recessed towards a front side 144 of the seat back 120. The lower side portions 142 are on opposite sides of a central rib 146. The lower side portions 142 include inwardly curved surfaces 148 that are shaped and contoured to provide increased knee room on opposite sides of the central rib 146.

As described, the seat back 120 pivotally couples to the seat support structure 102 at laterally spaced apart points, such as between the extension beams 114. As such, the pivot coupling of the seat back 120 to the seat support structure 102 does not interfere or extend into the lower side portions 142. In this manner, the seat back 120 couples to the seat support structure 102 without reducing an amount of knee room afforded by the lower side portions 142. The seat back 120 couples to the seat support structure 102 without decreasing knee room. The reduced thickness of the seat back 120 (which decreases from the top portion 126 to the lower portion 124) and the inwardly-recessed lower side portions 142 on either side of the central rib 146 provide greater space to accommodate the knees of passengers seated behind the seat back 120.

The reduced thickness of the seat back 120 and the recessed lower side portions 142 provide greater space to accommodate left and right knees of a passenger seated immediately behind the seat back 120, such as behind left and right buttocks of another seated passenger in front of the passenger. The seat back 120 provides physical separation between the knees of the passenger and the buttocks of the other seated passenger.

With respect to any of the embodiments of the present disclosure, the thickness of the seat back 120 in non-central sections of the lower portion 134 may be reduced compared to the thickness in the central section. The thickness of the seat back 120 in non-central sections of the lower portion 134 may be reduced to less than one inch.

With respect to any of the embodiments of the present disclosure, the thickness of the seat back 120 in non-central sections of the lower portion 134 may be reduced compared to the thickness in the central section. The thickness of the seat back 120 in non-central sections of the lower portion 134 may be reduced to less than one-half inch.

With respect to any of the embodiments of the present disclosure, the thickness of the seat back 120 in non-central sections of the lower portion 134 may be reduced compared to the thickness in non-central sections of the upper portion 126. The thickness of the seat back 120 in a central section of the lower portion 134 may be increased compared to the thickness in a central section of the upper portion 126. The increased thickness in the central section of the lower portion 134 is associated with at least one of an increased cushion thickness for passenger lower back support, an increased cushion thickness for passenger lumbar support, and a thickness associated with a seat back pocket installation behind the central section of the lower portion.

In at least one embodiment, the seat back 120 may also include a pocket 147 secured to the central rib 146. The pocket 147 may be used to store magazines, for example. The pocket 147 is above the lower side portions 142 and does not interfere therewith. The pocket 147 may not laterally extend past side portions of the central rib 146. As such, the pocket 147 is a reduced size retainer that does not interfere with the additional leg room created by the recessed lower side portions 142, for example. Optionally, the pocket 147 may be positioned lower on the central rib 146, such as between the lower side portions 142.

Figure 4:
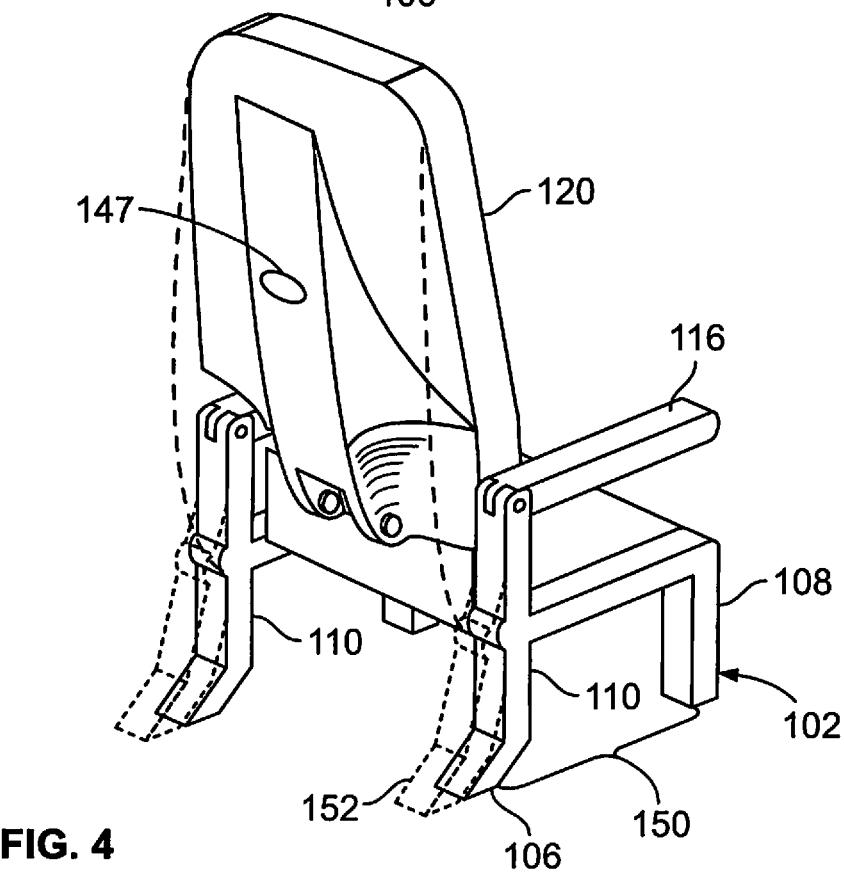
FIG. 4 illustrates a perspective rear view of a seat assembly, according to an embodiment of the present disclosure.

FIG. 4 illustrates a perspective rear view of the seat assembly 100, according to an embodiment of the present disclosure. The embodiment shown in FIG. 4 is the same as that described with respect to FIG. 3, except that the rear legs 110 of the seat support structure 102 may be closer to the front legs 108. That is, the distance 150 between the front legs 108 and the rear legs 110 is less than that of a standard seat support structure 152 (shown in dashed lines), thereby providing increased leg room to a passenger seated behind the seat assembly 100.

Figure 5:
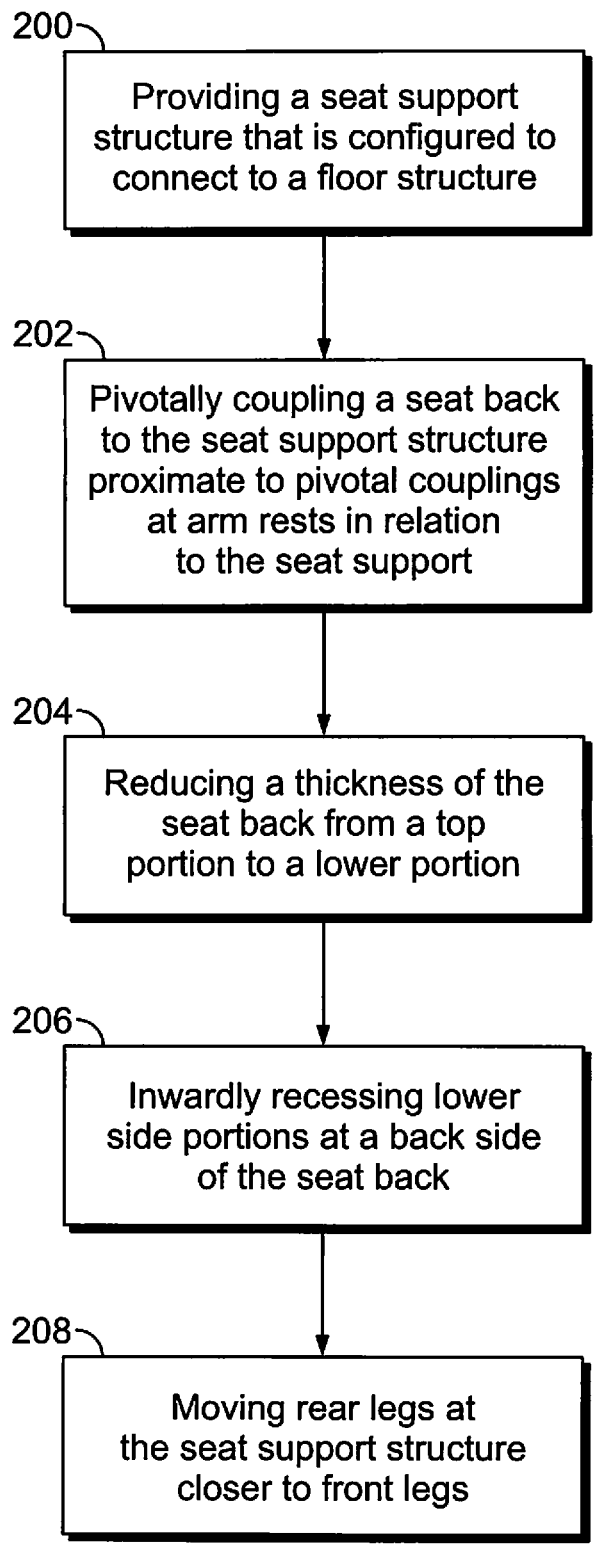
FIG. 5 illustrates a flow chart of a method of providing a seat assembly, according to an embodiment of the present disclosure.

FIG. 5 illustrates a flow chart of a method of providing a seat assembly, according to an embodiment of the present disclosure. Referring to FIGS. 3-5, the method includes providing, at 200, the seat support structure 102 that is configured to connect to a floor structure within an interior cabin. At 202, the method includes pivotally coupling the seat back 120 to the seat support structure 102 proximate to pivotal couplings of the arm rests 116 in relation to the seat support structure 102. At 204, the method includes reducing a thickness of the seat back 120 from the upper portion 126 to the lower portion 124. At 206, the method includes inwardly recessing the lower side portions of the back side 138 of the seat back 120 to provide increased knee room. Optionally, at 208, the method may include moving the rear legs 110 of the seat support structure 102 close to the front legs 108, in order to provide increased leg room as compared to a standard seat support structure. Alternatively, the method does not include 208.

Figure 6:
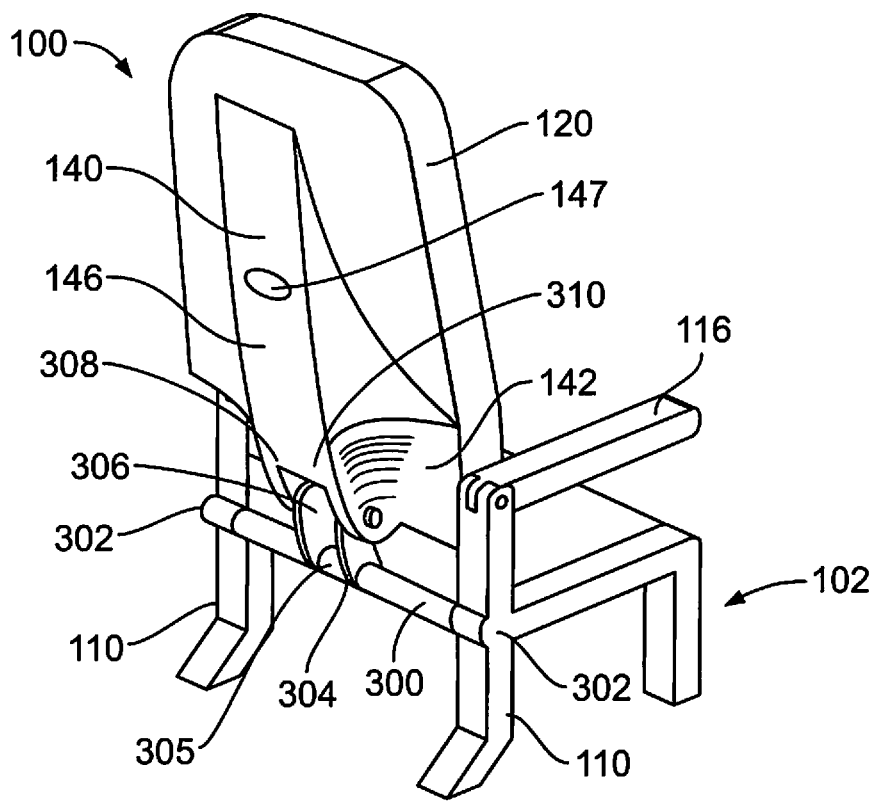
FIG. 6 illustrates a perspective rear view of a seat assembly, according to an embodiment of the present disclosure.

FIG. 6 illustrates a perspective rear view of a seat assembly 100, according to an embodiment of the present disclosure. In this embodiment, the seat back 120 may not be pivotally coupled to the seat support structure 102 proximate to the arm rests 116. The seat back 120 may include the reduced thickness, as described above. Further, the seat back 120 may include the inwardly recessed lower side portions 142, as described above.

The seat support structure 102 may include a rear cross beam 300 that spans between upper ends 302 of the rear legs 110. A seat back coupling 304 upwardly and rearwardly extends from a middle portion 305 of the rear cross beam 300 underneath the central rib 146. The seat back coupling 304 is not underneath either of the recessed lower side portions 142.

The seat back coupling 304 includes an upper end 306 that pivotally couples (such as through a hinge, rod, and/or the like) to a narrowed mounting portion 308 of a lower end 310 of the central rib 146. The narrowed mounting portion 308 is between the recessed lower side portions 142. That is, the narrowed mounting portion 308 does not extend into the recessed lower side portions 142. Neither the narrowed mounting portion 308, nor the seat back coupling 304 is positioned in locations laterally spaced from the central rib 146 (such as within the recessed lower side portions 142).

As shown, the seat back 120 does not pivotally couple at extended lateral positions of the seat support structure 102. Instead, the seat back coupling 304 and the narrowed mounting portion 308 cooperate to pivotally couple the seat back 120 to the seat support structure 102 at a narrowed area between the lower side portions 142. The narrowed mounting portion 308 upwardly and rearwardly extending from the middle portion 305 of the rear cross beam 300, the recessed lower side portions 142, and the reduced thickness of the seat back 120 provide increased space to accommodate the knees of a passenger seated behind the seat back 120.

In at least one embodiment, the seat back 120 may also include inwardly-moved rear legs 110, such as described with respect to FIG. 4. Further, the seat back 120 may also include the pocket 147 on the central rib 146, as described above with respect to FIG. 3.

Figure 7:
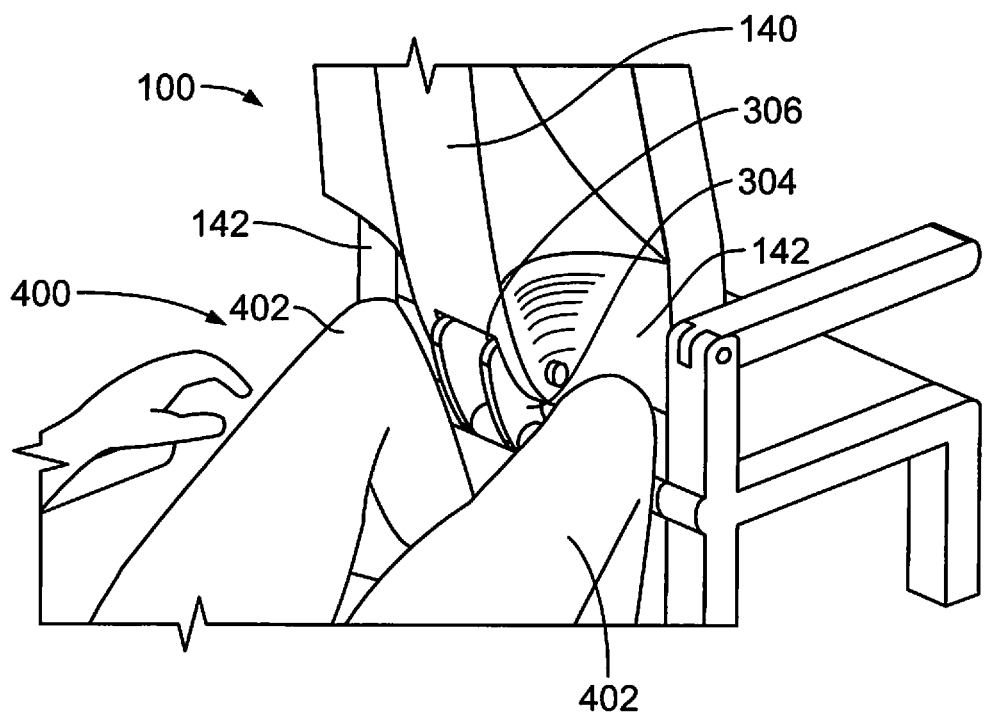
FIG. 7 illustrates a perspective view of a passenger seated behind a seat assembly, according to an embodiment of the present disclosure.

FIG. 7 illustrates a perspective view of a passenger 400 seated behind the seat assembly 100, according to an embodiment of the present disclosure. As shown, knees 402 of the passenger 400 do not abut into the rear portions of the seat assembly 100. Instead, the knees 402 are afforded extra space by the recessed lower side portions 142, and the lack of a pivotal coupling therein. The seat back coupling 304 pivotally couples the seat back 120 to the seat support structure 102 via the narrowed mounting portion 308 such that the seat back 120 is configured to pivotally recline without impinging on locations laterally spaced from the central rib 146, such as the recessed lower side portions 142.

Figure 8:
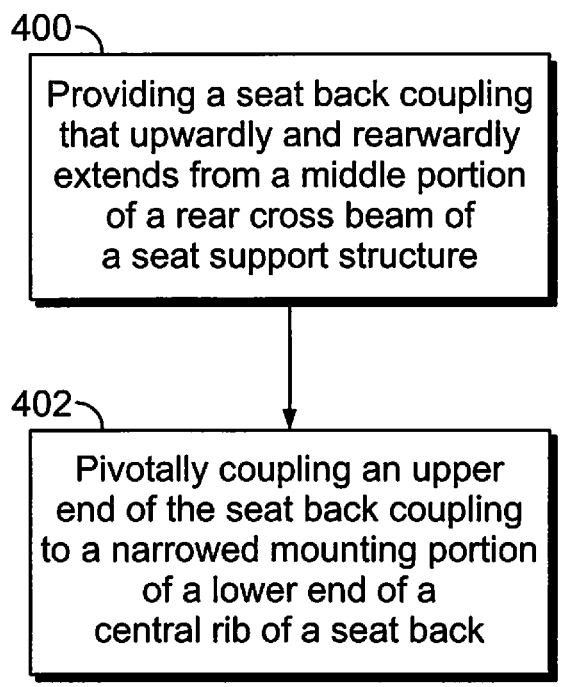
FIG. 8 illustrates a flow chart of a method of providing a seat assembly, according to an embodiment of the present disclosure.

FIG. 8 illustrates a flow chart of a method of providing a seat assembly, according to an embodiment of the present disclosure. Referring to FIGS. 6-8, the method includes providing, at 400, the seat back coupling 304 that upwardly and rearwardly extends from the middle portion 305 of the rear cross beam 300 underneath the central rib 146, such that the seat back coupling 304 is not underneath either of the recessed lower side portions 142. The method also include pivotally coupling, at 402, the upper end 306 of the seat back coupling 304 to the narrowed mounting portion 308 of the lower end 310 of the central rib 146.

Referring to FIGS. 1-8, certain embodiments of the present disclosure provide systems and methods for increasing knee room for passengers seated in seat assemblies separated from immediately forward seat assemblies by a reduced pitch (such as 30 inches or less). The systems and methods include providing increased knee room by forming the recessed lower side portions 142 in the seat assemblies 100, and pivotally coupling the seat backs 120 to the seat support structures 102 away from the recessed lower side portions 142, such as between the recessed lower side portions 142, or proximate to the arm rests 116. In at least one embodiment, the aircraft 10 includes an internal cabin (such as shown in FIGS. 2A and 2B) in which the seat assemblies 100 provide increased leg and knee room for passengers at a reduced pitch between longitudinally adjacent seat assemblies 100.

Figure 9:
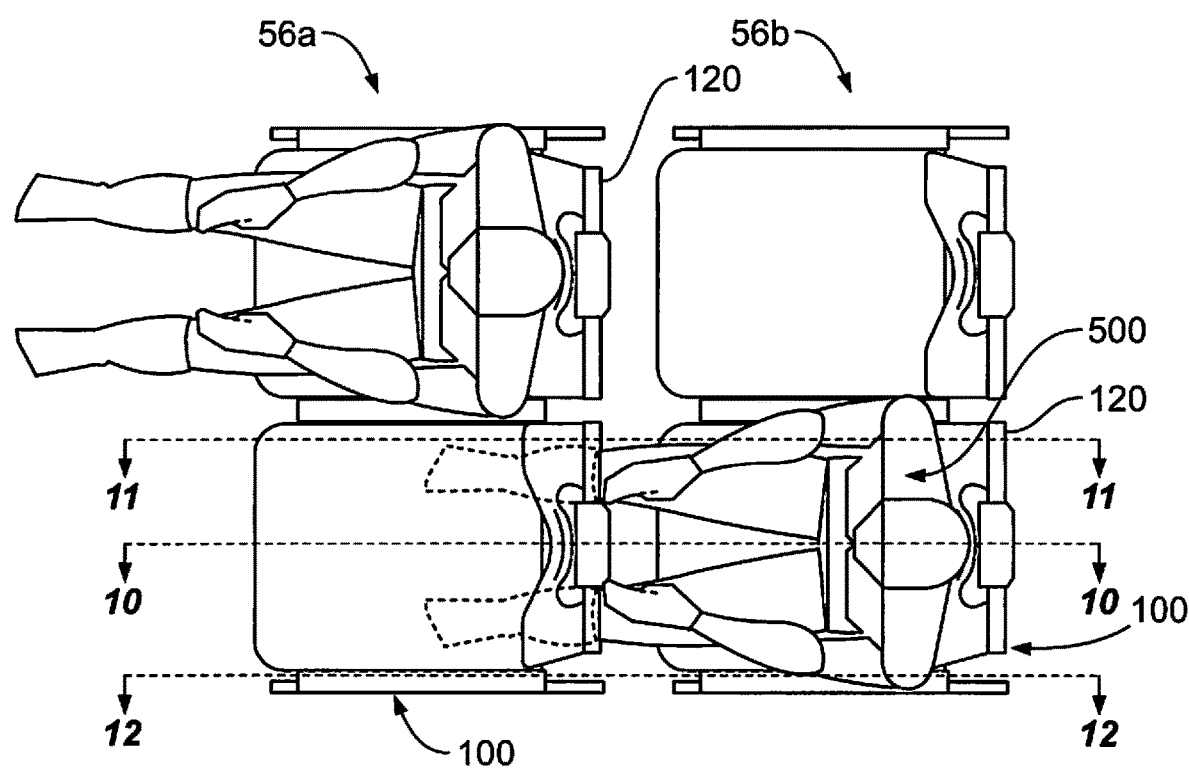
FIG. 9 illustrates a top view of a passenger in a seat of a row immediately behind a seat in another row, according to an embodiment of the present disclosure.
Figure 10:
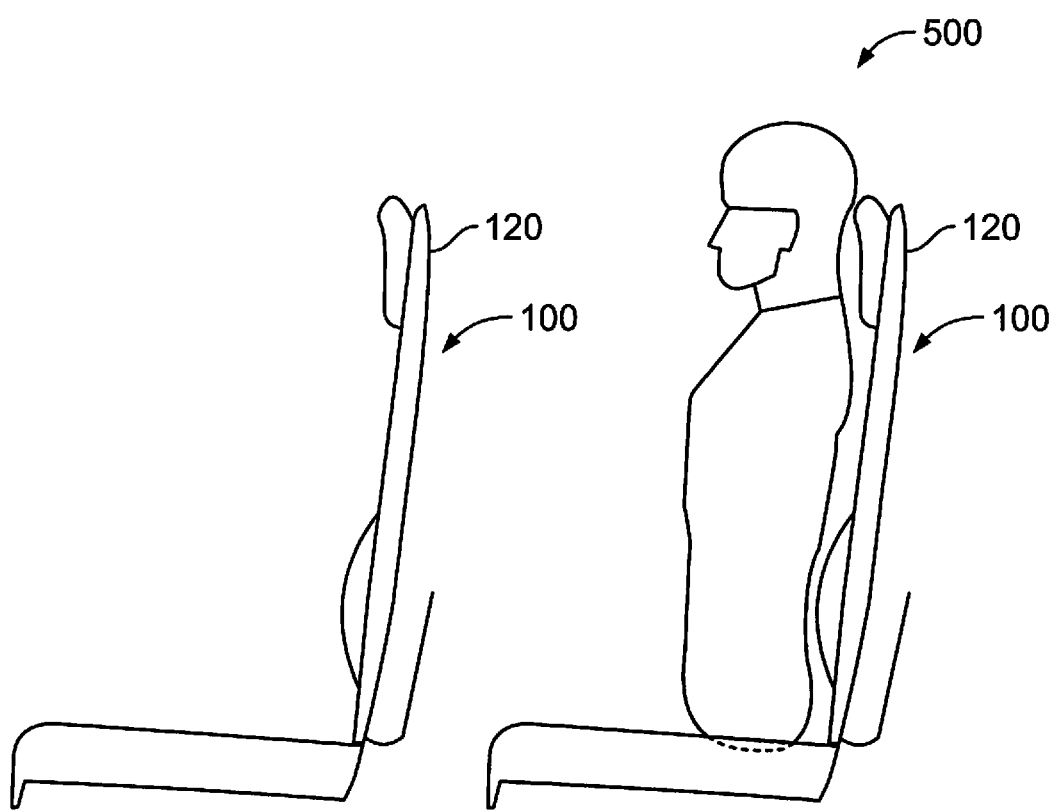
FIG. 10 illustrates a cross-sectional view of immediately adjacent seats through line 10-10 of FIG. 9, according to an embodiment of the present disclosure.
Figure 11:
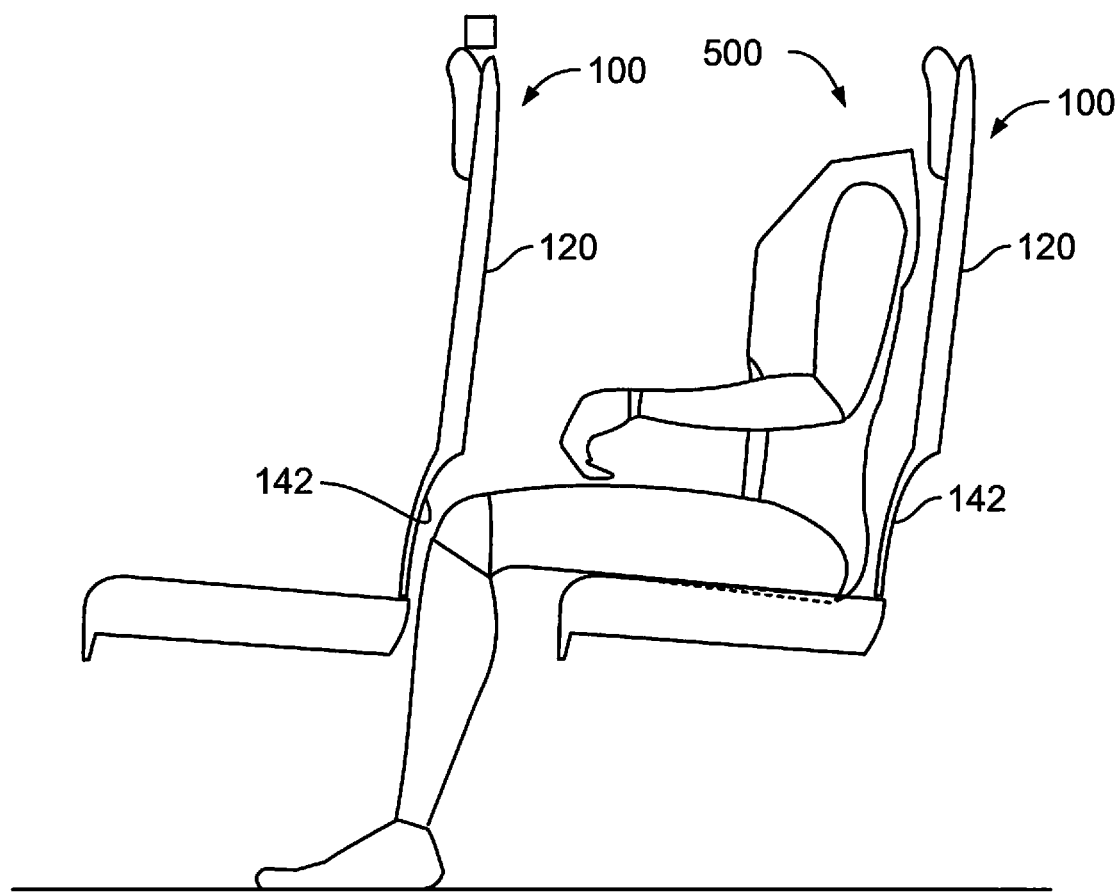
FIG. 11 illustrates a cross-sectional view of immediately adjacent seats through line 11-11 of FIG. 9, according to an embodiment of the present disclosure.
Figure 12:
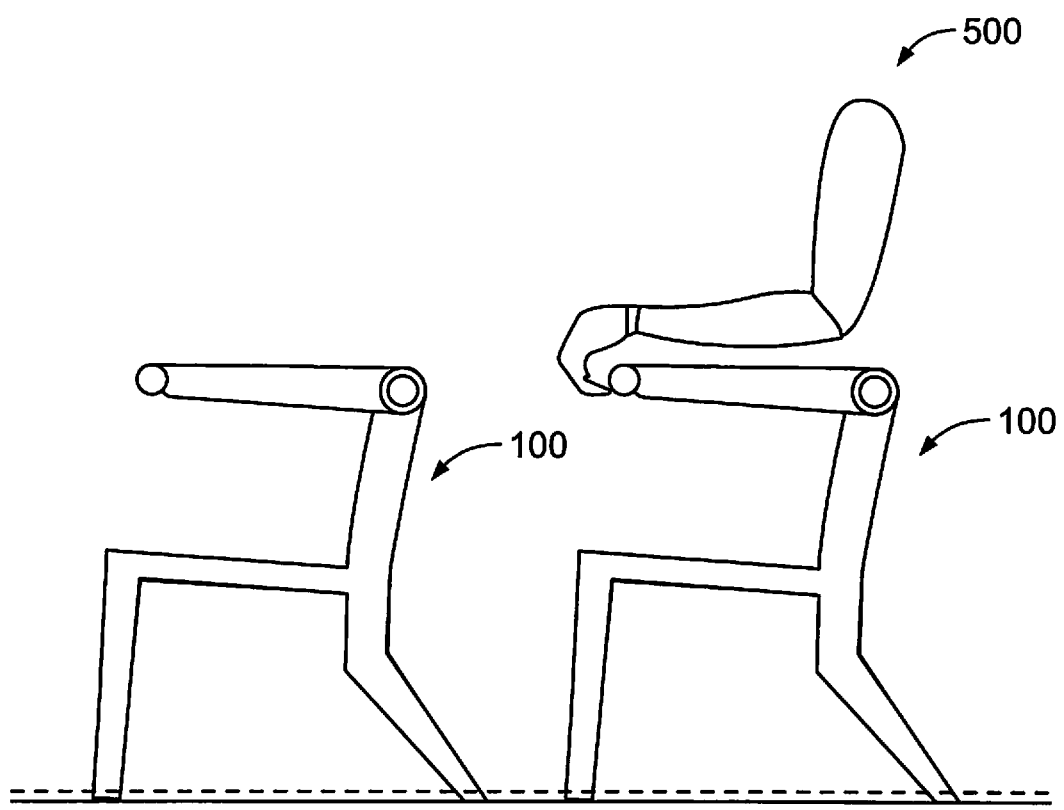
FIG. 12 illustrates a cross-sectional view of immediately adjacent seats through line 12-12 of FIG. 9, according to an embodiment of the present disclosure.
Figure 13:
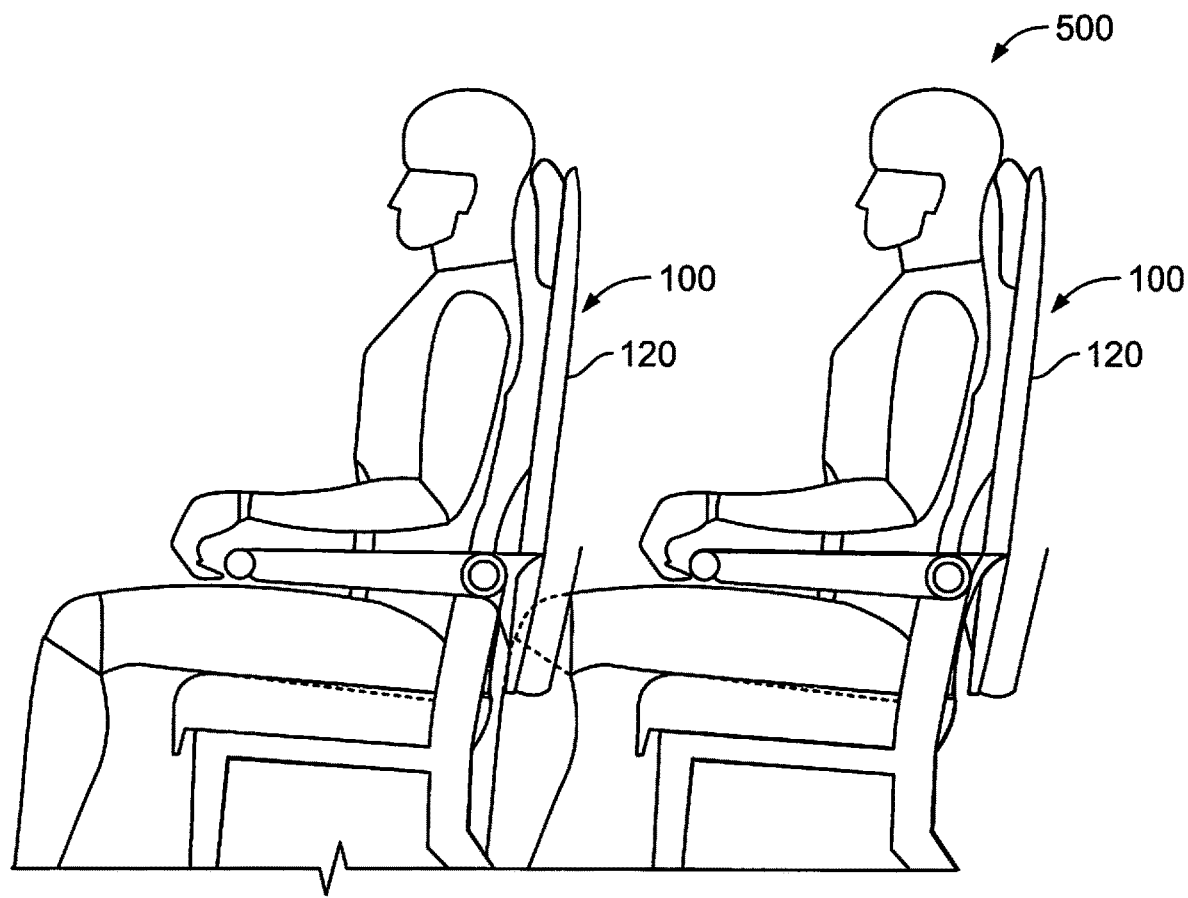
FIG. 13 illustrates a lateral view of a passenger in a seat immediately behind a seat, according to an embodiment of the present disclosure.

FIG. 9 illustrates a top view of a passenger 500 in a seat of a 100 row 56b immediately behind a seat 100 in another row 56a, according to an embodiment of the present disclosure. FIG. 10 illustrates a cross-sectional view of immediately adjacent seats 100 through line 10-10 of FIG. 9. FIG. 11 illustrates a cross-sectional view of immediately adjacent seats 100 through line 11-11 of FIG. 9. FIG. 12 illustrates a cross-sectional view of immediately adjacent seats 100 through line 12-12 of FIG. 9. FIG. 13 illustrates a lateral view of a passenger 500 in a seat 100 immediately behind a seat 100. It is to be understood that the objects within FIGS. 9-13 are simplified and transparent to show various aspects of embodiments of the present disclosure as described herein.

Referring to FIGS. 1-13, the reduced thickness of the seat back 120 and the recessed lower side portions 142 provide greater space to accommodate left and right knees of the passenger 500 seated immediately behind the seat back 120, such as behind left and right buttocks of another seated passenger in front of the passenger. The seat back 120 provides physical separation between the knees of the passenger and the buttocks of the other seated passenger.

Certain embodiments of the present disclosure provide an aircraft 10 including seat assemblies 100, as described herein. Each seat assembly 100 on the aircraft 10 is positioned at a pitch spacing of approximately 29 inches relative to an immediately forward seat assembly 100. The thickness of the seat back 120 in non-central parts of a lower portion 134 is reduced in non-central sections of the lower portion 134 of the seat back 120 to provide sufficient accommodation for persons in the 99.5 percentile thigh length or persons having a thigh length up to 28.2 inches, without knee impingement into the seat back 120 of an immediately forward seat assembly 100 in the non-central sections of the lower portion 134 of the seat back 120.

Embodiments of the present disclosure provide seat assemblies and methods of forming seat assemblies that allow for increased leg and knee room at reduced pitch between seat assemblies. As such, embodiments of the present disclosure provide increased passenger comfort, while allowing for increased airline operator revenue and profitability. Further, embodiments of the present disclosure allow for reduced fuel burn per seat-mile, reduced CAROC per seat-mile, reduced AROC per seat-mile, and reduced carbon dioxide emission per seat-mile.

Embodiments of the present disclosure provide a seat assembly within an interior cabin of a vehicle that is configured to provide increased knee space for passengers. Further, embodiments of the present disclosure provide a vehicle (such as an aircraft) having a relatively short seat pitch between rows of seats (such as a 29 inch seat pitch or less) and seat assemblies having a seat back with a middle portion and lower side portions on opposite sides of and laterally spaced from the middle section that are inwardly recessed towards a front side of the seat back, such that the seat back thickness is reduced at the lower side portions to provide increased knee room. The vehicle having the short seat pitch between rows of seats (such as a 29 inch seat pitch or less) includes seat assemblies having seat backs with reduced thickness on opposite sides of the middle section that are able to comfortably accommodate taller and larger passengers so that the passengers are not susceptible to contacting an immediately forward seat with their knees.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A seat assembly configured to be positioned within an interior cabin of a vehicle, the seat assembly comprising:
   a seat support structure that is configured to connect to a floor structure within the interior cabin of the vehicle, wherein the seat support structure includes a seat base, a front end opposite from a rear end, and a rear cross beam;

a seat back coupling upwardly and rearwardly extending from a middle portion of the rear cross beam, such that the seat back coupling is not disposed in locations laterally spaced from the middle portion; and a seat back including a narrowed mounting portion that pivotally couples to the seat back coupling without interfering with knee space formed in a back side of the seat back.

2. The seat assembly of claim 1, wherein the seat support structure comprises front legs at the front end and rear legs at the rear end.

3. The seat assembly of claim 1, wherein the narrowed mounting portion of the seat back that pivotally couples to the seat back coupling is disposed in a middle section of the seat back and not in lower side portions of the seat back that are laterally spaced from the middle section.

4. The seat assembly of claim 3, wherein the lower side portions of the seat back on opposite sides of the middle section are inwardly recessed towards a front side of the seat back such that the seat back thickness is reduced at the lower side portions that are inwardly recessed to provide increased knee room on opposite sides of the middle section of the seat back.

5. The seat assembly of claim 2, wherein a distance between the front legs and the rear legs is less than that of a standard seat support structure.

6. The seat assembly of claim 1, wherein the seat back comprises a lower portion and an upper portion, wherein a thickness of the seat back decreases from the upper portion towards the lower portion.

7. The seat assembly of claim 5, wherein the back side of the seat back includes a middle section that extends from a position proximate to the upper portion towards the lower portion.

8. The seat assembly of claim 7, wherein lower side portions are inwardly recessed towards a front side of the seat back, and wherein the lower side portions are on opposite sides of a central rib.

9. The seat assembly of claim 8, wherein the lower side portions include inwardly curved surfaces that are shaped and contoured to provide increased knee room on opposite sides of the central rib.

10. The seat assembly of claim 8, wherein the seat back pivotally couples to the seat support structure away from the lower side portions.

11. The seat assembly of claim 8, further comprising a pocket secured to the central rib.

12. The seat assembly of claim 11, wherein the pocket is above the lower side portions and does not extend into the lower side portions.

13. The seat assembly of claim 11, wherein the pocket is between the lower side portions and does not extend into the lower side portions.

14. The seat assembly of claim 1, wherein the front end is configured to be separated from another rear end of an immediately forward seat assembly by a pitch of 30 inches or less.

15. A method of providing a seat assembly that is configured to be positioned within an interior cabin of a vehicle, the method comprising:

providing a seat support structure that is configured to connect to a floor structure within the interior cabin of the vehicle, wherein the seat support structure includes a seat base, a front end opposite from a rear end, and a rear cross beam;

providing a seat back coupling that upwardly and rearwardly extends from a middle portion of the rear cross beam; and pivotally coupling a narrowed mounting portion of a seat back to the seat back coupling without interfering with knee space formed in a back side of the seat back.

16. The method of claim 15, further comprising moving rear legs closer to front legs of a seat support structure such that a distance between the front legs and the rear legs is less than that of a standard seat support structure.

17. The method of claim 15, further comprising decreasing a thickness of the seat back from an upper portion towards a lower portion.

18. The method of claim 15, further comprising inwardly recessing lower side portions of a back side of the seat back towards a front side of the seat back.

19. The method of claim 15, wherein the pivotally coupling comprises pivotally coupling the narrowed mounting portion to the seat back coupling away from the lower side portions.

20. The method of claim 18, further comprising securing a pocket to a central rib between the lower side portions.

* * * * *